Patented June 17, 1947

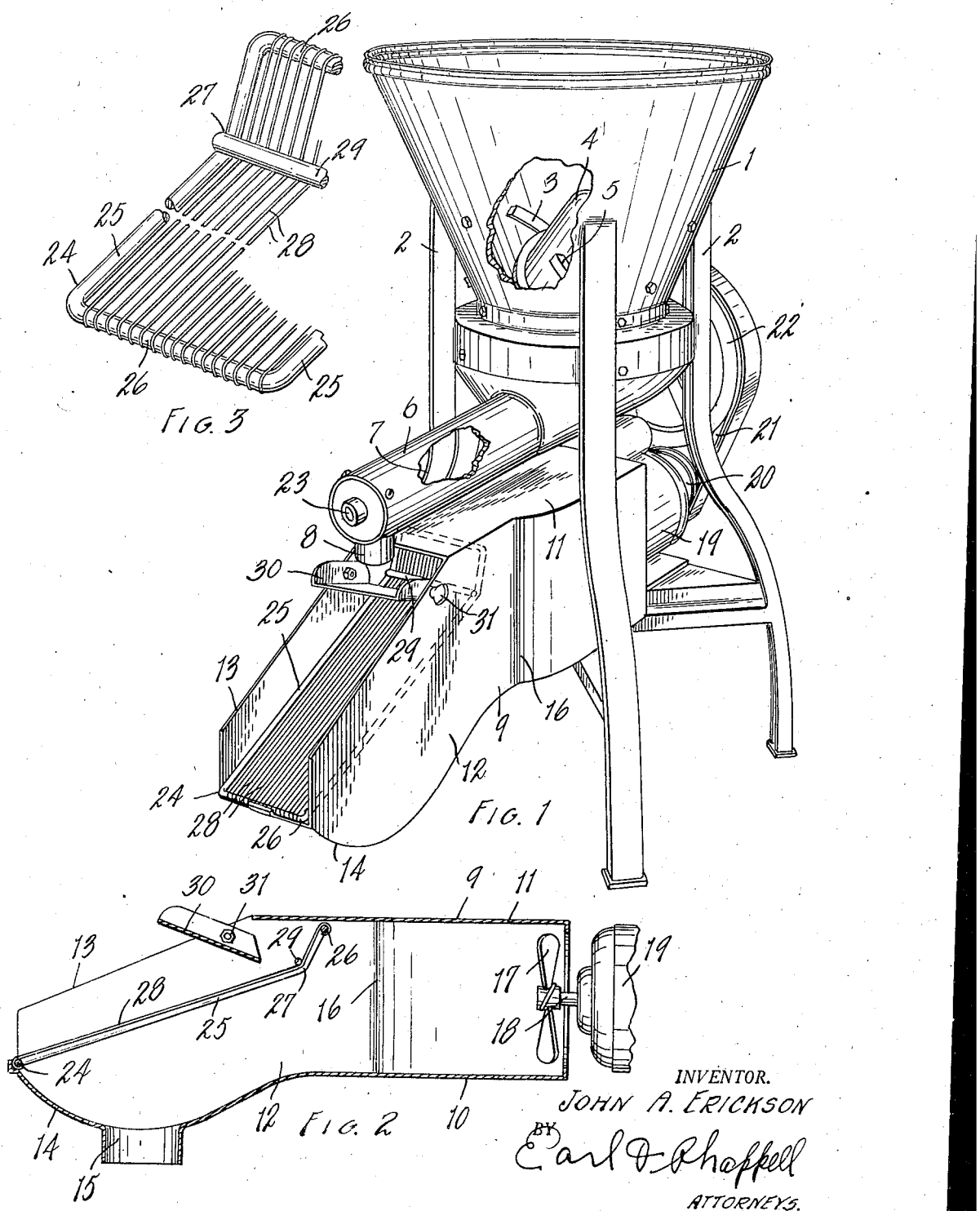

2,422,399

UNITED STATES PATENT OFFICE 2,422,399

CORN SHELLING AND SHREDDING, AND SEPARATOR MACHINE

John A. Erickson, Jackson, Mich.

Application April 26, 1945, Serial No. 590,404

6 Claims. (Cl. 146—76)

This invention relates to improvements in corn shelling and shredding, and separator machine.

The main objects of this invention are:

First, to provide a separator for corn shelling and shredding machines in which the grain is effectively removed from the cobs and the cobs and attached husks separated from the shelled corn.

Second to provide a machine of this character which is simple and compact and one which is not likely to become clogged and requires a minimum of attention.

Objects pertaining to details and economies of the invention will definitely appear from the description to follow. The invention is defined in the claims.

A structure which embodies the features of the invention is clearly illustrated in the accompanying drawing in which:

Fig. 1 is a perspective view of a machine embodying the features of my invention, parts being broken away to show structural details.

Fig. 2 is a fragmentary longitudinal section through the main portion of the separator.

Fig. 3 is a fragmentary perspective view of the screen of the embodiment of my invention illustrated.

The embodiment of the invention illustrated is an adaptation to the corn shelling and shredding machine illustrated in my application for Letters Patent filed August 5, 1944, Serial No. 548,228. I have not illustrated all of the shelling and shredding mechanism as that forms no part of my present invention, but the said application for patent shows a highly satisfactory shelling and shredding means.

In the accompanying drawing the hopper 1 is adapted to receive ears of corn and quite commonly at the present time when corn is husked by machinery or partly husked by hand, with no great care taken to remove all of the husks, there is a substantial amount of husk left on the ears that may be placed in the hopper. The hopper is supported by legs 2 which constitute supports for the entire machine. The hopper is provided with an internal spiral rib 3 while the rotor 4 is provided with a spiral rib 5. These ribs coact to insure the feeding of the grain downwardly and in shelling the corn. The shredder mechanism is not illustrated.

The tubular discharge chute 6 is provided with a conveyor screw 7 which positively carries the mixed corn and shredded cobs and husks to the downwardly directed discharge 8.

The separator housing designated generally by the numeral 9 comprises a bottom 10, top 11 and side walls 12. The top 11 terminates in substantially spaced relation to the rear ends of the bottom and side walls, the upper edge of the side walls at the rear of the top being downwardly inclined at 13. The rear end of the bottom is downwardly curved at 14 and provided with a discharge opening 15 for the shelled corn. At its front end the housing in the embodiment illustrated is flared outwardly at 16. The blower 17 is arranged at the front end of the housing and in this embodiment is of the fan form or type. The blower is mounted on the shaft 18 of the motor 19. The motor is provided with a pulley 20 which is connected by the belt 21 to the pulley 22 on the shaft 23 of the conveyor. This shaft is geared to the shelling and shredding mechanism.

At the rear open end of the housing I provide a screen which in the embodiment illustrated comprises a border frame 24 consisting of side members 25 and end members 26, these being preferably formed integrally of rod stock. The side members are angled at 27. The grid elements 28 are preferably formed of wire as illustrated and extend between and are secured to the end members of the frame. A cross piece 29 extends across the grid elements at the angle of the side members, keeping the grid elements substantially parallel to the side members. These grid elements are spaced to permit the kernels of corn to pass freely between them but are sufficiently close to obstruct the passage of larger pieces of cob. The passage of the lighter material such as cob is further prevented by the blast of air from the blower so that in the operation of the machine the grain is effectively separated from the other material.

To distribute or spread the material discharged from the chute well across the screen and also separate the lighter material such as pieces of husk and the smaller pieces of cob, I provide a rearwardly inclined separator and spreader plate 30 which is disposed to extend between the side walls and is tiltably secured thereon by means of the bolts 31. The forward end of this plate extends across the housing below the rear end of the top wall and forms in effect a transverse partition separating the air discharged from the blower into two streams, one stream passing over and across the plate and carrying with it the small particles of cob and the pieces of husk. The discharge screw insures a positive and fairly uniform discharge of the material.

There being no transverse obstructions on the grid elements below the point of discharge of the spreader plate thereto, the screen does not become clogged. This is a feature of great advantage as these machines are designed for use mainly by dairymen and farmers, and one of the advantages is that the hopper may be associated with the feed chute to deliver a given quantity of corn, the machine starter, and the operator may then go about other work.

I have illustrated and described my invention in a highly satisfactory and practical embodiment thereof. I have not attempted to illustrate or describe other embodiments or adaptations as it is believed this disclosure will enable those skilled in the art to adapt the invention as may be desired.

Having thus described my invention what I claim as new and desire to secure by Letters Patent is:

1. A separator for use with a corn shelling and shredding machine including means to remove the corn from the cob and to shred the cobs and attached husk and provided with a tubular discharge chute having a downwardly directed discharge and a conveyor screw within the chute for positively conveying the material to the chute discharge, said separator comprising a separator housing including bottom, top and side walls, the top wall terminating in substantially spaced relation to the rear ends of the bottom and side walls, the upper edges of the side walls at the rear of the top being downwardly inclined, the rear portion of the bottom being downwardly curved and provided with a discharge opening, a grid-like screen comprising a border frame consisting of side members and connecting end members, the side members being turned upwardly adjacent their forward ends, parallel grid wires extending longitudinally between and secured at their ends to the end members of the frame, a cross member arranged above said grid wires at the angles of said side members, said screen being arranged in a rearwardly inclined relation between said side walls and in spaced relation to the upper edges thereof with the forward end of the screen below and adjacent to the top, a forwardly inclined adjustably mounted spreader plate for receiving the material from the discharge of the chute to direct and spread said material upon the screen, a blower at the front end of said housing, said spreader plate extending across the housing with its forward end extending below the rear end of the top whereby a portion of the air discharged from the blower is directed over the spreader plate, the longitudinal grid wires of said screen being unobstructed by cross members below the point of discharge of the spreader plate thereto.

2. A separator for use with a corn shelling and shredding machine including means to remove the corn from the cob and to shred the cobs and attached husk and provided with a tubular discharge chute having a downwardly directed discharge and a conveyor screw within the chute for positively conveying the material to the chute discharge, said separator comprising a separator housing including bottom, top and side walls, the top wall terminating in substantially spaced relation to the rear ends of the bottom and side walls, the upper edges of the side walls at the rear of the top being downwardly inclined, the rear portion of the bottom being downwardly curved and provided with a discharge opening, a grid-like screen comprising a border frame consisting of side members and connecting end members, parallel grid wires extending longitudinally between and secured at their ends to the end members of the frame, said screen being arranged in a rearwardly inclined relation between said side walls and in spaced relation to the upper edges thereof with the forward end of the screen below and adjacent to the top, a forwardly inclined spreader plate for receiving the material from the discharge of the chute to direct and spread said material upon the screen, a blower at the front end of said housing, said spreader plate extending across the housing with its forward end extending below the rear end of the top whereby a portion of the air discharged from the blower is directed over the spreader plate, the longitudinal grid wires of said screen being unobstructed by cross members below the point of discharge of the spreader plate thereto.

3. A separator for use with a corn shelling and shredding machine including means to remove the corn from the cob and to shred the cobs and attached husk and provided with a tubular discharge chute having a downwardly directed discharge and a conveyor screw within the chute for positively conveying the material to the chute discharge, said separator comprising a separator housing including bottom, top and side walls, the top wall terminating in substantially spaced relation to the rear ends of the bottom and side walls, a grid-like screen comprising a border frame consisting of side members and connecting end members, the side members being turned upwardly adjacent their forward ends, parallel grid wires extending longitudinally between and secured at their ends to the end members of the frame, a cross member arranged above said grid wires at the angles of said side members, said screen being arranged in a rearwardly inclined relation between said side walls and in spaced relation to the upper edges thereof with the forward end of the screen below and adjacent to the top, a forwardly inclined adjustably mounted spreader plate for receiving the material from the discharge of the chute to direct and spread said material upon the screen, and a blower at the front end of said housing, said spreader plate extending across the housing with its forward end extending below the rear end of the top whereby a portion of the air discharged from the blower is directed over the spreader plate, the longitudinal grid wires of said screen being unobstructed by cross members below the point of discharge of the spreader plate thereto.

4. A separator for use with a corn shelling and shredding machine including means to remove the corn from the cob and to shred the cobs and attached husk and provided with a tubular discharge chute having a downwardly directed discharge and a conveyor screw within the chute for positively conveying the material to the chute discharge, said separator comprising a separator housing including bottom, top and side walls, the top wall terminating in substantially spaced relation to the rear ends of the bottom and side walls, a grid-like screen comprising a border frame consisting of side members and connecting end members, parallel grid wires extending longitudinally between and secured at their ends to the end members of the frame, said screen being arranged in a rearwardly inclined relation between said side walls and in spaced relation to the upper edges thereof with the forward end of the screen below and adjacent to the top, a forwardly inclined spreader plate for receiving the material from the discharge of the chute to direct and spread said material upon the screen, and a blower at the front end of said housing, said spreader plate extending across the housing with its forward end extending below the rear end of the top whereby a portion of the air discharged from the blower is directed over the spreader plate, the longitudinal grid wires of said screen being unobstructed by cross members below the point of discharge of the spreader plate thereto.

5. In a separator of the class described, the combination with a chute having a downwardly directed discharge, of a separator housing including bottom, top and side walls, the top wall terminating in substantially spaced relation to the rear ends of the bottom and side walls, the bottom being provided with a grain discharge opening, a grid-like screen comprising a border frame, the side members being turned upwardly adjacent their forward ends, parallel grid elements extending longitudinally between and secured at their ends to the end members of the frame, a cross member arranged above said grid element at the angles of said side members, said screen being arranged in a rearwardly inclined relation between said side walls with the forward upturned end of the screen below and adjacent to the top, a forwardly inclined tiltably mounted spreader plate disposed below the discharge of the chute to direct and spread the material discharged from the chute upon the screen, and a blower at the front end of said housing, said spreader plate extending across the housing with its forward end extending below the rear end of the top so that a portion of the air discharged from the blower is directed over the spreader plate, the longitudinal grid elements of said screen being unobstructed by cross members below the point of discharge of the spreader plate thereto.

6. In a separator of the class described, the combination with a chute having a downwardly directed discharge, of a separator housing including bottom, top and side walls, the top wall terminating in substantially spaced relation to the rear ends of the bottom and side walls, the bottom being provided with a grain discharge opening, a grid-like screen comprising a border frame and parallel grid elements extending longitudinally of the frame, said screen being arranged in a rearwardly inclined relation between said side walls with the forward end of the screen below the top, a spreader plate inclined downwardly and forwardly and disposed below the discharge of the chute to direct and spread the material discharged from the chute upon the screen, and a blower at the front end of said housing, said spreader plate extending across the housing at the rear of the discharge of the blower so that a portion of the air discharged from the blower is directed over the spreader plate, said spreader plate being spaced from said top to permit passage of air with lighter materials upwardly and rearwardly over the top of the spreader plate, the longitudinal grid elements of said screen being unobstructed by cross members below the point of discharge of the spreader plate thereto.

JOHN A. ERICKSON.

REFERENCES CITED

The following references are of record in the file of this patent:

UNITED STATES PATENTS

| Number | Name | Date |
| --- | --- | --- |
| 125,392 | Holt | Apr. 9, 1872 |
| 2,156,716 | Beckwith | May 2, 1939 |
| 2,382,040 | Erickson | Aug. 14, 1945 |

FOREIGN PATENTS

| Number | Country | Date |
| --- | --- | --- |
| 668,890 | France | July 23, 1929 |